United States Patent [19]

Jordan

[11] Patent Number: 4,535,980

[45] Date of Patent: Aug. 20, 1985

[54] LOG HOLDER FOR USE IN SPLITTING LOGS

[76] Inventor: Ross W. Jordan, 1627 Gist Rd., Cloquet, Minn. 55720

[21] Appl. No.: 563,992

[22] Filed: Dec. 21, 1983

[51] Int. Cl.³ .............................................. B23Q 3/02

[52] U.S. Cl. .................................... 269/102; 269/156; 248/156; 144/193 K

[58] Field of Search .............. 144/3 K, 193 R, 193 A, 144/193 B, 193 C, 193 D, 193 E, 193 F, 193 G, 193 H, 193 J, 193 K; 269/102, 152, 156, 303; 248/156, 188.7, 164, 165, 127

[56] References Cited

U.S. PATENT DOCUMENTS

| | | | |
|---|---|---|---|
| 3,341,162 | 9/1967 | Ruchlis | 248/165 |
| 4,144,971 | 3/1979 | Balibrea | 248/156 |
| 4,466,601 | 8/1984 | Raines | 269/79 |

*Primary Examiner*—W. D. Bray

*Assistant Examiner*—Jorji M. Griffin

*Attorney, Agent, or Firm*—Kinney & Lange

[57] ABSTRACT

A log holder for holding a log in a position to facilitate splitting of the log, the log holder having a plurality of diverging wall members joined to each other at the rear edges. The log holder is provided with means for supporting the wall members at an angle such that the junction of the rear edges slopes rearwardly from bottom to top. The log is placed between the diverging wall members and is held by gravity in a position inclined with respect to the vertical. Arms are provided to prevent the split pieces of the log from flying sideways. The restrained pieces are held in position for further splitting, or for pick-up with less stooping. Provision is also made for supporting a tool or tools on the log holder in a position for quick access where they do not interfere wtih the chopping action. The sheet metal members are secured to an angle iron which may be driven into the ground or in a modified form, secured to a supporting framework resting on the ground. A block of wood may be recessed in the ground beneath where the log rests so as to provide a chopping block which the axe hits when the wood is split.

7 Claims, 8 Drawing Figures

LOG HOLDER FOR USE IN SPLITTING LOGS

BACKGROUND OF THE INVENTION

1. Field of the Invention

The field of the invention is that of log holders for holding logs at the desired angle for splitting.

2. Description of the Prior Art

The problem of holding a log while it is being split is one that has plagued mankind for years. The simplest procedure, of course, is to simply stand the log on a relatively flat surface and hope that it stands upright while the axe is being swung. Unfortunately, the end surface of a log is not always perpendicular to the axis of the log. Furthermore, logs tend to be very irregular in shape at times so that there is no certainty that an edge of a log, even if relatively perpendicular to the axis of the log, will remain in an upright position while the axe is being swung.

There are, of course, numerous power operated devices for splitting logs. These, however, are often expensive and require considerable manipulation. A skilled chopper can chop wood by the use of an axe much more rapidly than the logs can be split by some of the power operated devices.

As a result, various arrangements have been provided for supporting a log while it is being chopped. For example, the Cross U.S. Pat. No. 4,211,264 shows an arrangement involving a vertical pole which is supported by a platform resting on the ground. Slidably secured to the vertical pole is a sleeve which in turn supports a splitting device. Such an arrangement is difficult to set up and is quite expensive to manufacture.

The Marley U.S. Pat. No. 4,326,703 shows an arrangement for clamping a log vertically within a frame by the use of a plurality of clamping bars which pull the log up against the corner of the frame. Again, this arrangement involves considerable manipulation to hold a log. Furthermore, the framework on which the clamping bars are mounted would hinder its use with an axe because the axe handle would tend to strike the frame as the axe descended through the wood.

The Harris U.S. Pat. No. 2,592,895 shows a tree holder which does show a means for holding a cylindrical piece of wood vertically. This, however, is not adapted for splitting and employs a support which would be in the way of any axe handle.

The Meacham U.S. Pat. No. 4,280,540 shows an arrangement for holding a wedge with respect to a log to be split. Again, the device is fairly complicated and is primarily concerned with the use of a wedge. It is not designed to be operated with an axe.

Not only are the above patents concerned with reasonably complicated arrangements but all hold a log in a vertical position. Actually, this is not the desirable position in which to hold a lor for splitting. The log should be inclined somewhat since the axe engages a log during the final portion of an arcuate swing of the axe.

SUMMARY OF THE INVENTION

The present invention is concerned with a very simple type of log holder in which the log is held in a slightly inclined position. It is formed of sheet metal which enables the log holder to be readily assembled by the user. Means are provided for firmly supporting the log holder on the ground either by designing part of the frame of the holder so that it can be driven into the ground or by a framework which rests on the ground.

Basically, the improved device involves two wall members which are joined to each other at the edges and which diverge from the rear to the front edges to form a log receiving area between them. Ground engaging means is secured to the rear edges of the wall members for supporting the wall members at the desired angle.

The log holder of the present invention also has an arm extending forwardly from each wall, the arms extending towards each other sufficiently to limit the outer movement of pieces of the log after being split but having their forward ends separated sufficiently to permit an axe handle to pass freely between the arms. The top edge of each of the arms preferably is inclined downwardly from the rear to the front to minimize the possibility of engagement with the axe as the axe is swung forwardly.

Provision is also made for providing a tool holder in connection with at least one wall, this tool holder being a portion which extends outwardly and provides a means against which the handle of the tool can rest.

BRIEF DESCRIPTION OF THE DRAWINGS

Other objects and features of the invention will be apparent from a consideration of the accompany specification, claims and, drawing in which:

DESCRIPTION OF THE PREFERRED EMBODIMENTS

Figure 1:
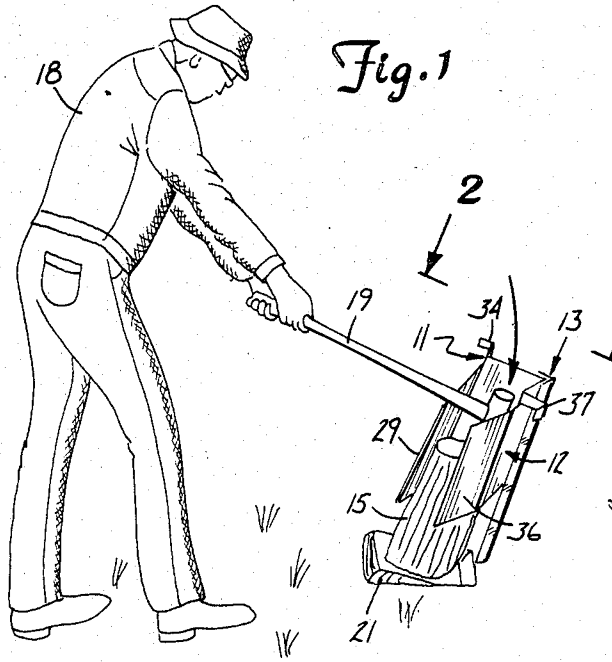
FIG. 1 is a perspective view of an improved tool holder in use, showing a piece of wood being split.
Figure 2:
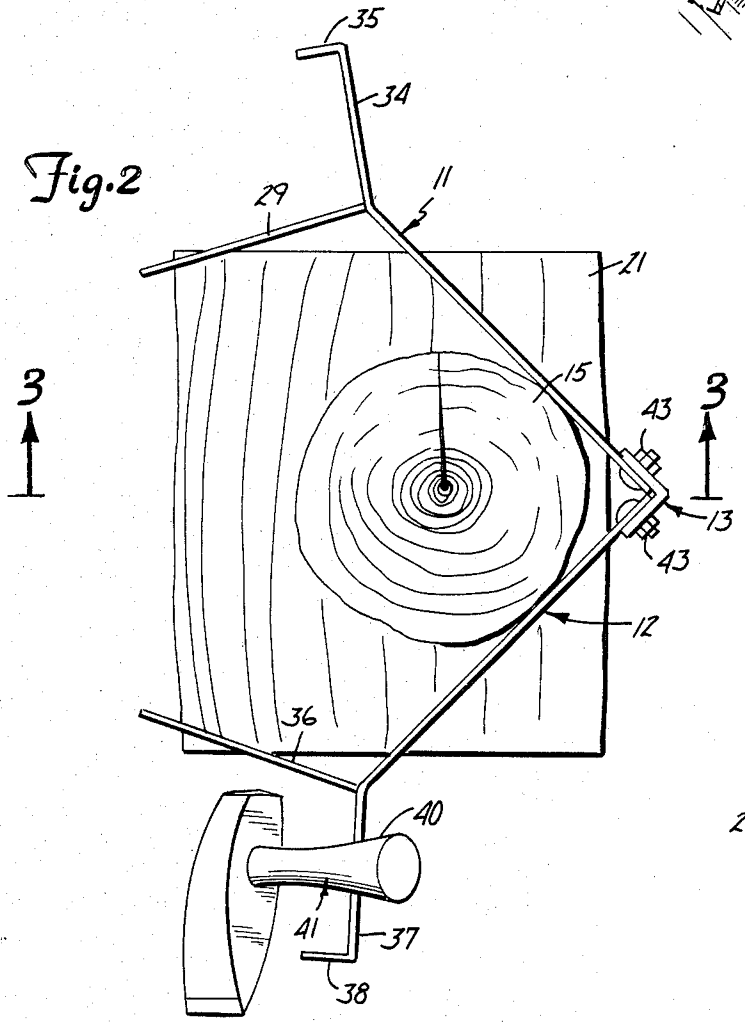
FIG. 2 is a top plan view, the view being taken in the direction of the arrows 2—2 of FIG. 1.

Referring first to FIG. 1, I have shown the improved log holder in use. The log holder is generally composed of two wall members 11 and 12 which are secured to an angle iron member 13 which is driven into the ground. As best shown in FIG. 2, the two walls 11 and 12 diverge outwardly from their rear to their front to form a recess for holding a log which is indicated in FIG. 1 by the reference numeral 15. As is evident from both FIGS. 1 and 3, the lower end of the angle iron 12 is driven into the ground so as to rigidly support the upper end of the angle iron and the two wall members 11 and 12. Furthermore, it will be noted that the angle iron is driven in so that the angle iron slopes rearwardly from the bottom to the top. As best shown in FIG. 1, a chopper, indicated by the reference numeral 18, in swinging an axe 19 moves it through a circular arc in such a way that the axe blade is moving at an inclination to the vertical at the time it engages the log. Thus, the axe blade tends to hit the log squarely rather than at an inclination to the top surface of the log as is the case where the log is disposed vertically.

Figure 3:
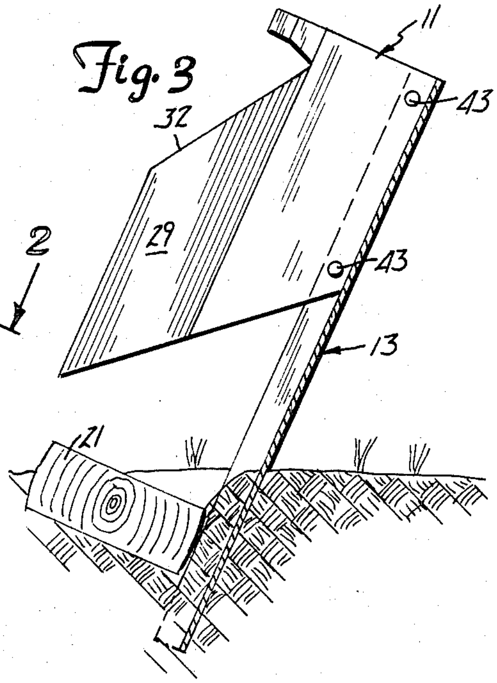
FIG. 3 is a vertical sectional view, the section being taken along the line 3—3 of FIG. 2.

It is preferable that a block of wood such as block 21, shown in FIGS. 1 and 3, be partially embedded into the ground at the lower portion of the holder, the wood preferably being inclined so that its upper surface is at right angles to the longitudinal axis of the angle iron 13. In this way, the lower end of the log tends to rest against the upper surface of the block 21 throughout most of the area of the lower surface of the log. The purpose of the block 21 is to ensure that the axe blade in passing through the log will hit wood rather than the ground. This tends to prevent the axe blade from getting dull by contact with the earth and any small stones that might be present.

Figure 4:
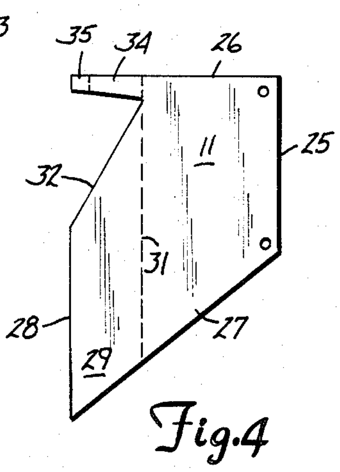
FIG. 4 is a view of one of the wall members prior to assembly.

Referring to the details of the holder, the holder initially is in the form of a kit comprising the two side walls 11 and 12 and the angle iron 13 and the necessary bolts and nuts to hold the side walls to the angle iron. A side wall 11 is shown in FIG. 4 prior to bending and assembly. The wall has a rear edge 25, an upper edge 26 extending at right angles to the rear edge 25 and a lower edge 27 which slopes downwardly from the rear to the front. The wall also has a forward edge 28 which is basically parallel to the rear edge 25. The forward edge 28 forms the front edge of an arm 29 which as shown in FIG. 2 is bent inwardly along a fold line 31. The upper edge of arm 29 has a sloping edge 32 which slopes downwardly from its rear to the front edge 28. This is formed by cutting out a notch in the wall member 11. Also extending forwardly from the main portion of the wall 11 is an arm 34 which is bent outwardly about a continuation of the fold line 31. At the outer edge of the arm 34 there is an inwardly bent flange 35. The wall 12 has a similar inwardly bent arm 36 and a small arm 37 which has an inwardly bent flange 38. Both the arms 34 and 37 are used to rest tools. It will be noted in the lower portion of FIG. 2 that the handle 40 of a splitting maul 41 is resting against the arm 37. It will be obvious that the handle of another tool such as an axe could be placed against the arm 34.

The two wall members 11 and 12, as previously explained, are secured to the two legs of an angle iron 13 by suitable nuts and bolts 43. As indicated in FIG. 3, there are two such nuts and bolts for the wall member 11. Similarly, there are two for the wall member 12. Thus, all that is required to assemble the device are four sets of nuts and bolts.

In practice, the two sheets 11 and 12 are supplied with the large arms 29 and 36 already bent inwardly about the fold line 31. After the two wall members 11 and 12 have been bolted to the angle iron by the four sets of nuts and bolts, the arms 34 and 37 are bent outwardly to the desired angle for holding the tool handles. Similarly, the flanges 35 and 38 are bent inwardly. This can readily be done with a pair of pliers.

When it is desired to use the unit, the angle iron 13 is driven into the ground by the use of a maul until the holder is anchored firmly. The base of the holder can be excavated slightly to permit the insertion of a slab 21. This can be simply a short piece of firewood which is cut off and placed in the opening. In actual use, the block or slab 21 tends to be pushed downward into the ground due to the impact of the axe or splitting maul on the block of wood 15.

Using the device, all that is necessary is to place the wood to be split within the opening between walls 11 and 12 as shown in FIGS. 1 and 2. There is ample room between the forward edges of the arms 29 and 36 to permit an axe to be freely swung. To further decrease the possibility of the axe handle accidently hitting the arms 29 and 36, the upper edges of these arms slope downwardly as has been shown in connection with upper sloping edge 32 of arm 29 of wall member 11. If the axe goes all the way through the wood 15, the axe blade will merely hit the block of wood 21 at the base and the axe blade will not be injured in any way.

The arms 29 and 36 prevent the pieces of wood from flying to one side. They are safely retained against outward movement beyond the arms 29 and 36.

It will be understood that the walls 11 and 12 prior to being folded are exactly the same and can be cut with the same type of cutting equipment. The unit comes with the two sheets of wall members 11 and 12 having the arms 29 and 36 already having bent inwardly. Also included is the angle iron 13 and the nuts and bolts. All that the purchaser has to do is to assemble the two wall members to the angle iron 13 by the four sets of nuts and bolts 43 and to bend the arms 34 and 37 and the flanges 35 and 38 to the desired position. As soon as the angle iron is then driven into the ground and the block of wood 21 installed, it is possible for the log holder to be used. By the use of such a log holder, it is possible to split the wood safely and rapidly. An experienced chopper can chop wood much more rapidly than with the use of a mechanical log splitter.

SPECIES OF FIGS. 5–8

In FIGS. 5–8, I have shown a modified form of the device. The species of FIGS. 1–4 is the preferred species. The species of FIGS. 5–8, although involving many more parts, has the advantage that it can be placed on the ground and used safely without the necessity of driving anything into the ground.

In order to facilitate a comparison of the two species, corresponding elements in the species of FIGS. 5–8 have been given numbers 50 higher than those in FIGS. 1–4. Where no other explanation appears, it can be assumed that an element having a reference numeral 50 higher than the one in FIGS. 1–4 is substantially the same as the corresponding element in FIGS. 1–4.

It can thus be seen that there are two wall members 61 and 62 which are bolted by nuts and bolts 96 to an angle iron 63. The wall members 61 and 62 have inwardly extending deflecting arms 79 and 86. In this case, however, these arms are fastened by nuts and bolts to the wall members 61 and 62. Similarly, there are two supporting arms 84 and 87 which are fastened by nuts and bolts to the wall members 61 and 62. These members have flanges 85 and 88, respectively. These arms, like the corresponding arms 34 and 37 are designed to support the handles of tools, this being shown in connection with a tool 91 in FIG. 5.

The arms 79 and 86, like arms 29 and 36 of the preferred embodiment, are designed to prevent pieces of wood from flying sideways after they have been split. In the modification of FIGS. 5–8, there are actually two such arms 79 and two such arms 86. This is desirable because these arms are relatively narrow as compared to the relatively wide arms 29 and 36 of the preferred species.

Figure 8:
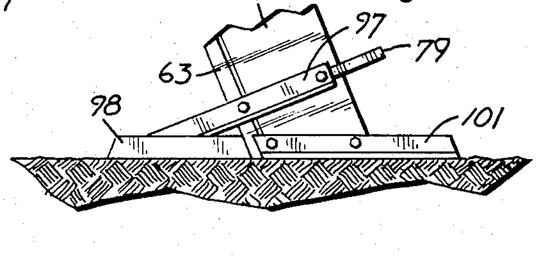
FIG. 8 is a fragmentary elevational view of the lower portion of the log holder viewed in the opposite direction from FIG. 7 to show the manner in which the base members are secured to the wall members.

In the present embodiment, the wall members 61 and 62 are not only secured to the angle iron 63, but are also secured to two crossed angle iron members 97 and 98. These angle iron members rest upon the ground and help stabilize and help support the log holder. Since the forward ends of both angle irons must rest on the ground, it is necessary for the angle iron 97 to be inclined upwardly so as to pass over the top of the flange of angle iron 98. This is shown in FIG. 8. Since the rear end of angle iron 97 is thus spaced from the ground, as shown in FIG. 8, it is necessary to employ a further angle iron 101 which is fastened to wall 61 in such a manner as to be horizontal and to engage the ground on the underside of the angle iron.

Figure 5:
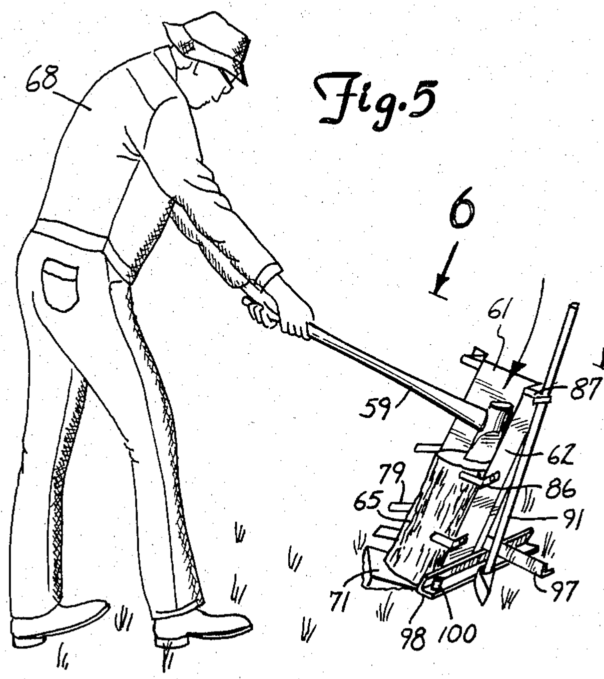
FIG. 5 is a view similar to FIG. 1 but showing a modified form of my invention.
Figure 7:
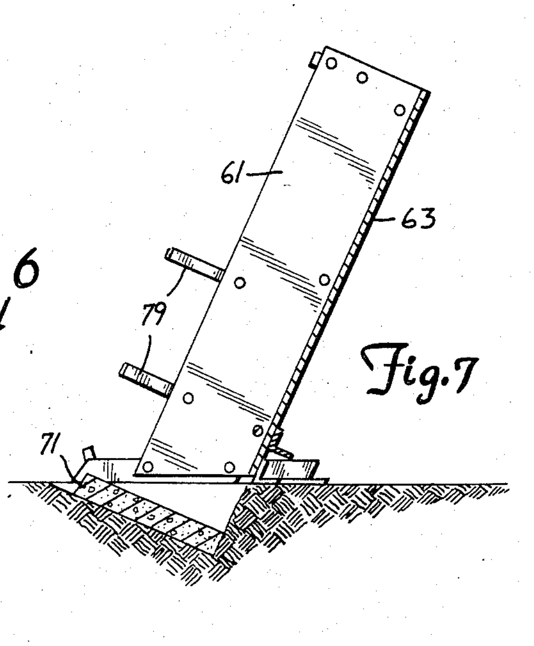
FIG. 7 is a vertical sectional view, the section being taken along the line 7—7 of FIG. 6.
Figure 6:
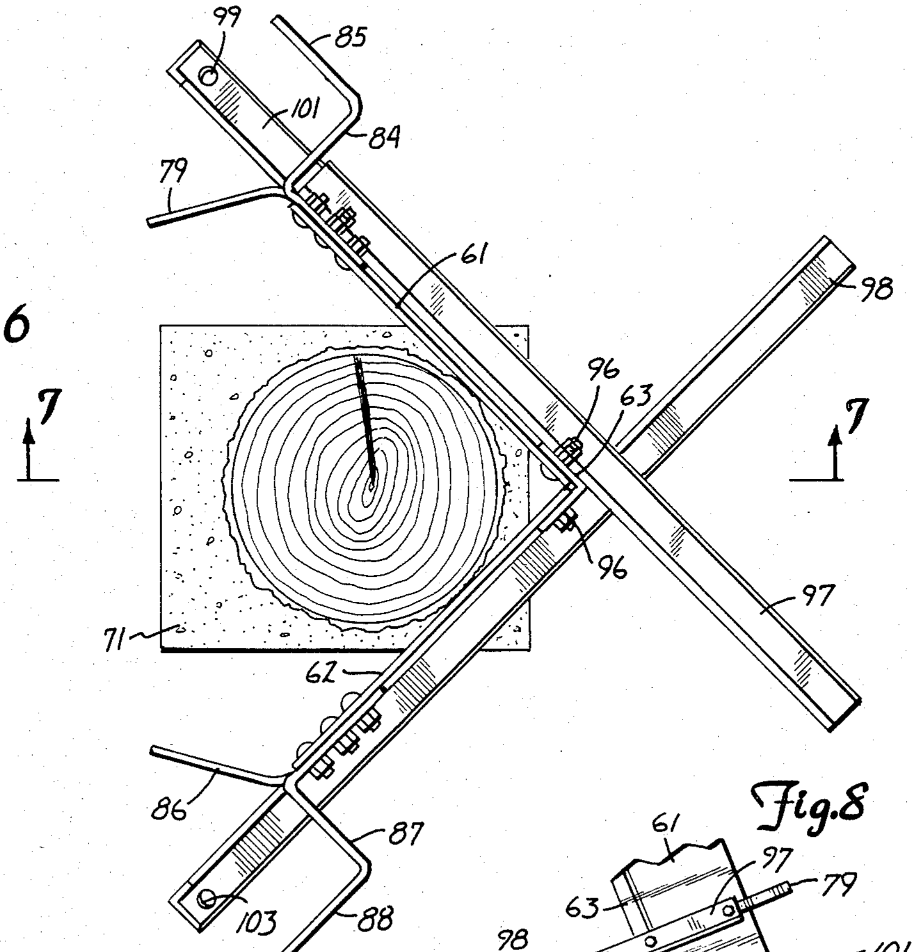
FIG. 6 is a top plan view, the view being taken in the direction of the arrows 6—6 of FIG. 5.

The forward ends of the angle irons 97 and 101 are provided with apertures 99 to permit a pin or stake such as stake 100 of FIG. 5 to be driven through the holes 99 into the ground to help anchor the angle irons 97 and 98.

It is believed that the operation of the arrangement of FIGS. 5–8 will be fairly obvious. Just as with the preferred species, a block of wood 71 is partially embedded in the ground beneath the log 65 to be split. While the arrangement of FIGS. 5–8, as previously pointed out, has the advantage of not necessitating the driving in of any member into the ground outside of the pegs 100, it does have the drawback that it has quite a few parts that must be assembled.

CONCLUSION

In both modifications of the invention, I have provided a log holder which is simple to set up and which enables a log of wood to be safely and easily split. Rather than having an arrangement in which the log has to be clamped in position, the log can be placed in the space between the arms of the log holder where it is held securely, because gravity holds it in position leaning against the holder. The wood will immediately assume the proper position no matter how crooked the ends are cut, or how slender the piece. There is no danger of pieces of the log flying apart and injurying a bystander because in both versions, there are arms that protect against this. The arms also hold the wood in place for further splitting, even to kindling size, without repositioning and without jeopardizing fingers, which would be required to hold a slender piece upright without the holder. The split pieces are left standing for pick-up with less stooping and no chasing.

The holder provides a convenient means for holding tools that are not being used. A very important feature of both species is that the wood is held at a correct angle for splitting. This is clearly obvious from FIGS. 1 and 5. In many of the prior art devices, the log is held in a vertical position. This is obviously not a correct position if the axe blade is to hit the log at the correct angle for proper splitting. If the ends of the log are crooked, or if the log is slender, considerable time may be required to stand it up vertically, or it may be impossible.

While I have shown certain specific embodiments of the invention for purposes of illustration, it is to be understood that the scope of the invention is limited solely by that of the appended claims.

What is claimed is:

1. A log holder for holding a log in a position to facilitate splitting a log and retaining the split pieces, said log holder comprising:

two wall members of sheet metal;

ground engaging means in the form of an angle iron; and means for detachably securing said sheet metal wall members at their rear edges to the flanges of said angle iron so that said wall members extend perpendicularly to each other, diverging from their rear to their front edges to form a log receiving area therebetween, the front edges of said wall members being spaced apart sufficiently to receive therebetween a log and to permit an axe handle to pass freely therebetween, said angle iron supporting said sheet metal wall members on the ground at such an angle that the junction of the rear edges of the wall members slopes rearwardly from bottom to top so as to support a log in such a manner that it tilts rearwardly.

2. The log holder of claim 1 in which the sheet metal wall members are secured to the angle iron with the lower edges of the wall members substantially above the lower end of the angle iron so that the lower end of said angle iron can be driven into the ground to support said wall members with respect to the ground at the proper angle of tilt.

3. The log holder of claim 1 in which at least one of said walls has a tool holder extending from the forward edges of the wall.

4. The log holder of claim 1 in which the ground engaging means includes two crossed structural beams which rest upon the ground and causes the wall members to be supported at the desired angle.

5. A log holder for holding a log in a position to facilitate splitting of the log and retaining the split pieces, said log holder comprising:

two wall members joined to each other at their rear edges and diverging from their rear to their front edges to form a log receiving area therebetween, each of said wall members having an arm extending forward therefrom, the arms extending toward each other sufficiently to limit the outward movement of pieces of the log after being split but having the forward ends thereof separated sufficiently to permit an axe handle to pass freely therebetween; and ground engaging means secured to the rear edges of said wall members for supporting said wall members at such an angle that the junction of the rear edges slopes rearwardly from bottom to top so as to support a log in such a manner that it tilts rearwardly.

6. The log holder of claim 5 in which the arms are integral with the walls and are bent inwardly with respect to the plane of the walls.

7. The log holder of claim 6 in which the upper edge of each of said arms inclines downwardly from the rear to the front to minimize the possibility of engagement with the axe as the axe is swung downwardly.

* * * * *